United States Patent
Takeda et al.

(10) Patent No.: US 10,465,770 B2
(45) Date of Patent: Nov. 5, 2019

(54) VEHICULAR POWER TRANSMITTING SYSTEM

(71) Applicants: TOYOTA JIDOSHA KABUSHIKI KAISHA, Toyota-shi, Aichi (JP); AISIN AW CO., LTD., Anjo-shi, Aichi (JP)

(72) Inventors: Yasunori Takeda, Toyota (JP); Takayuki Teramoto, Nisshin (JP); Naoki Itazu, Nagoya (JP); Kentaro Naruse, Anjo (JP); Yoshihiro Oishi, Anjo (JP); Hiroshi Fujita, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 41 days.

(21) Appl. No.: 15/962,470

(22) Filed: Apr. 25, 2018

(65) Prior Publication Data
US 2018/0306275 A1 Oct. 25, 2018

(30) Foreign Application Priority Data
Apr. 25, 2017 (JP) .................................. 2017-086646

(51) Int. Cl.
| F16H 1/28 | (2006.01) |
| F16H 57/10 | (2006.01) |
| F16H 57/00 | (2012.01) |
| F16H 37/02 | (2006.01) |
| F16H 57/035 | (2012.01) |

(Continued)

(52) U.S. Cl.
CPC ......... *F16H 1/2845* (2013.01); *F16H 37/022* (2013.01); *F16H 57/0037* (2013.01); *F16H 57/035* (2013.01); *F16H 57/10* (2013.01); *F16H 37/0813* (2013.01); *F16H 63/3026* (2013.01);

(Continued)

(58) Field of Classification Search
CPC .............. F16H 1/2845; F16H 63/3026; F16H 57/0037; F16H 57/10; F16H 57/0035; F16H 37/022
See application file for complete search history.

(56) References Cited

U.S. PATENT DOCUMENTS

| 6,033,335 A | 3/2000 | Hotta et al. | |
| 6,099,428 A * | 8/2000 | Kashiwase | F16H 3/60 475/210 |
| 2005/0250606 A1* | 11/2005 | Shioiri | F16H 9/125 474/18 |

FOREIGN PATENT DOCUMENTS

| JP | H11-132320 A | 5/1999 |
| JP | 2016-023801 A | 2/2016 |

* cited by examiner

*Primary Examiner* — Mark J Beauchaine
(74) *Attorney, Agent, or Firm* — Oliff PLC

(57) ABSTRACT

In a vehicular power transmitting system, a fixing portion of a brake retaining portion receives a reaction force from a reverse drive brake and is located in a portion of a circumference of the brake retaining portion, which is outside a predetermined circumferential portion close to the shifting shaft support portion and is defined by a pair of lines tangent to a circumference of the shifting shaft and parallel to a straight line connecting first and second axes and located on opposite sides of the straight line, as seen in a plane normal to the first axis, where a forward/reverse switching device including the reverse drive brake is disposed on the first axis, and a gear type transmission is disposed on the first axis and (Continued)

the second axis and an outer housing wall and a partition wall radially inwardly extending from the outer housing wall are provided.

8 Claims, 4 Drawing Sheets

(51) Int. Cl.
 *F16H 37/08* (2006.01)
 *F16H 63/30* (2006.01)
 *F16H 57/021* (2012.01)
(52) U.S. Cl.
 CPC .................. *F16H 2037/026* (2013.01); *F16H 2057/0216* (2013.01)

VEHICULAR POWER TRANSMITTING SYSTEM

This application claims priority from Japanese Patent Application No. 2017-086646 filed on Apr. 25, 2017, the disclosure of which is herein incorporated by reference in its entirety.

FIELD OF THE INVENTION

The present invention relates generally to a vehicular power transmitting system, and more particularly to an improvement of a vehicular power transmitting system of a type which includes a planetary gear set having a selectively fixed rotary element and which is configured to be placed in a reverse drive position when the selectively fixed rotary element is fixed to a casing with a reverse drive brake.

BACKGROUND OF THE INVENTION

There is known a vehicular power transmitting system which includes a forward/reverse switching device of a planetary gear type disposed on a first axis, and a gear type transmission mechanism disposed on the first axis and a second axis parallel to the first axis, and which has a first power transmitting path through which a drive force of a vehicle driving power source is transmitted to an output shaft disposed on a third axis parallel to the second axis, through the forward/reverse switching device and the gear type transmission mechanism. JP-2016-23801A discloses an example of such a vehicular power transmitting system, which includes a belt-and-pulley type continuously variable transmission having a primary pulley disposed on the first axis and a secondary pulley disposed on the third axis. This vehicular power transmitting system has a second power transmitting path which is parallel to the first power transmitting path and through which the drive force of the vehicle driving power source is transmitted to the output shaft such that a speed ratio of the vehicular power transmitting system is continuously changed by the continuously variable transmission.

SUMMARY OF THE INVENTION

By the way, the forward/reverse switching device described above is configured to be placed in a reverse drive position when a selectively fixed rotary element (ring gear shown in JP-2016-23801A) of a planetary gear set is fixed to a casing with a reverse drive brake retained on the casing. Accordingly, vibrations generated upon gear meshing engagement of the planetary gear set ("gear-meshing vibrations") are transmitted to a brake retaining portion of the casing at which the reverse drive brake is retained, and are further transmitted to an outer housing wall of the casing, whereby the vibrations give rise to a risk of generation of a noise ("gear noise"). Described more specifically, the casing includes an outer housing wall, and a partition wall which extends from the outer housing wall radially inwardly of the outer housing wall so as to reach a radially outer portion of the forward/reverse switching device. The partition wall is provided with the above-indicated brake retaining portion, so that the gear-meshing vibrations are transmitted to the outer housing wall through the partition wall through the brake retaining portion. Where a shifting shaft of the gear type transmission mechanism is disposed on the above-indicated second axis positioned between the outer housing wall of the casing and the above-indicated first axis, and is supported at a shifting shaft support portion positioned between the outer housing wall and the brake retaining portion, the gear-meshing vibrations transmitted to the brake retaining portion are relatively easily transmitted to the outer housing wall through the shifting shaft support portion, which has a comparatively high degree of rigidity, so that there is a considerably high risk of generation of the above-indicated gear noise, whereby the vehicular power transmitting system in question suffers from a low degree of NV-free performance (noise/vibration-free performance).

The present invention was made in view of the background art described above. It is therefore an object of the present invention to provide a vehicular power transmitting system which is configured to reduce the gear noise due to the gear-meshing vibrations of the planetary gear set of the forward/reverse switching device which are transmitted from the partition wall of the casing to the outer housing wall of the casing when the forward/reverse switching device is placed in the reverse drive position.

The object indicated above is achieved according to the following modes of the present invention:

According to a first mode of the invention, there is provided a vehicular power transmitting system comprising a forward/reverse switching device of a planetary gear type disposed on a first axis and including a reverse drive brake, and a gear type transmission mechanism disposed on the first axis and a second axis parallel to the first axis and having a shifting shaft disposed on the second axis, the vehicular power transmitting system including a power transmitting path through which a drive force of a vehicle driving power source is transmitted to an output shaft disposed on a third axis parallel to the second axis, through the forward/reverse switching device and the gear type transmission mechanism, the vehicular power transmitting system further comprising: a casing which comprises an outer housing wall having cylindrical shape and in which the second axis is positioned between the outer housing wall and the first axis; the casing further comprising a partition wall which is formed integrally with the outer housing wall, so as to extend from the outer housing wall radially inwardly of the outer housing wall, the partition wall including a brake retaining portion at which the reverse drive brake of the forward/reverse switching device is retained, the partition wall further including a shifting shaft support portion which is disposed between the brake retaining portion and the outer housing wall and by which the shifting shaft of the gear type transmission mechanism is supported; the forward/reverse switching device including a planetary gear set having a selectively fixed rotary element, and being configured to be placed in a reverse drive position when the selectively fixed rotary element is fixed with the reverse drive brake; and the brake retaining portion including a fixing portion which receives a reaction force from the reverse drive brake, the fixing portion being located in a portion of a circumference of the brake retaining portion, which portion is outside a predetermined circumferential portion of the circumference which is close to the shifting shaft support portion in a circumferential direction of the brake retaining portion about the first axis and in which the fixing portion is inhibited from being located, the predetermined circumferential portion being defined by a pair of tangential lines which are tangent to a circumference of the shifting shaft supported by the shifting shaft support portion and which are parallel to a straight line connecting the first and second axes and located on opposite sides of the straight line, as seen in a plane normal to the first axis.

According to a second mode of the invention, the vehicular power transmitting system according to the first mode of the invention further comprising a second power transmitting path including a belt-and-pulley type continuously variable transmission which has a primary pulley disposed on the first axis and a secondary pulley disposed on the third axis, and the second power transmitting path is disposed in parallel with the power transmitting path, the drive force of the vehicle driving power source being transmitted through the continuously variable transmission to the output shaft such that a speed ratio of the vehicular power transmitting system is continuously changed by the continuously variable transmission. In this second mode of the invention, the drive force is transmitted from the secondary pulley to the output shaft through a belt driving clutch, and the output shaft is provided with a driven portion to which the drive force is transmitted from the gear type transmission mechanism. Further, the partition wall has a stepped wall portion formed such that the belt-and-pulley type continuously variable transmission, the belt driving clutch and the driven portion are disposed on one of opposite sides of the partition wall while the forward/reverse switching device and the gear type transmission mechanism are disposed on the other side of the partition wall, the stepped wall portion having a communication aperture formed between the second and third axes, to permit the drive force to be transmitted from the gear type transmission mechanism to the driven portion.

According to a third mode of the invention, the vehicular power transmitting system according to the first or second mode of the invention is configured such that the second axis is located above the first axis in a vertical direction of a vehicle provided with the vehicular power transmitting system.

According to a fourth mode of the invention, the vehicular power transmitting system according to any one of the first through third modes of the invention is configured such that the reverse drive brake is a friction brake including casing-side friction members engaged with an inner circumferential surface of the brake retaining portion through a recessed/raised portion formed on the inner circumferential surface such that the casing-side friction members are not rotatable, and gear-side friction members engaged with the selectively fixed rotary element of the planetary gear set through a recessed/raised portion formed on the selectively fixed rotary element such that the gear-side friction members are rotated together with the selectively fixed rotary element, the casing-side friction member and the gear-side friction members being frictionally engaged with each other to fix the selectively fixed rotary element to the brake retaining portion. The recessed/raised portion of the inner circumferential surface of the brake retaining portion which engages the casing-side friction members such that the casing-side friction members are not rotatable functions as the fixing portion.

In the vehicular power transmitting system according to the first mode of the invention, the forward/reverse switching device is placed in the reverse drive position when the selectively fixed rotary element is fixed to the brake retaining portion with the reverse drive brake retained on the brake retaining portion of the partition wall. However, the fixing portion which receives the reaction force from the reverse drive brake, in other words, the fixing portion to which gear-meshing vibrations of the planetary gear set are transmitted, is located in the portion of the circumference of the brake retaining portion about the first axis, which portion is outside the predetermined circumferential portion which is close to the shifting shaft support portion in the circumferential direction of the brake retaining portion and in which the fixing portion is inhibited from being located about the first axis. Accordingly, the gear-meshing vibrations of the planetary gear set which are generated during running of a vehicle in the reverse drive position and which are transmitted to the outer housing wall of the casing through the shifting shaft support portion are reduced, so that the noise generated due to the vibrations of the outer housing wall is reduced to improve the NV-free performance of the vehicular power transmitting system. In particular, it is noted that the predetermined circumferential portion is defined by the pair of tangential lines which are tangent to the circumference of the shifting shaft and which are parallel to the straight line connecting the first and second axes and located on the opposite sides of the straight line, as seen in the plane normal to the first axis. Therefore, the vibrations transmitted to the shifting shaft support portion are effectively reduced.

According to the second mode of the invention, the vehicular power transmitting system has another power transmitting path through which the drive force of the vehicle driving power source is transmitted from the belt-and-pulley type continuously variable transmission to the output shaft such that the speed ratio of the vehicular power transmitting system is continuously changed by the continuously variable transmission. Further, the drive force is transmitted from the secondary pulley to the output shaft through the belt driving clutch, and the output shaft is provided with the driven portion to which the drive force is transmitted from the gear type transmission mechanism. In addition, the partition wall has the stepped wall portion formed such that the belt-and-pulley type continuously variable transmission, the belt driving clutch and the driven portion are disposed on one side of the partition wall while the forward/reverse switching device and the gear type transmission mechanism are disposed on the other side of the partition wall. The stepped wall portion has the communication aperture formed between the second and third axes. In the presence of this communication aperture, vibrations would be likely to be transmitted through the shifting shaft support portion located near the communication aperture, and the rigidity of the outer housing wall of the casing is reduced, so that a considerable noise would be generated. In the power transmitting system according to the present invention, however, the fixing portion which receives the reaction force from the reverse drive brake is located in the portion of the circumference of the brake retaining portion which is outside the predetermined circumferential portion corresponding to the shifting shaft support portion, so that the vibrations to be transmitted to the outer housing wall through the shifting shaft support portion are reduced, whereby the generation of the noise due to the vibrations is effectively reduced.

According to the third mode of the invention, the second axis is located above the first axis in the vertical direction of the vehicle provided with the vehicular power transmitting system. The planetary gear set of the forward/reverse switching device generates gear-meshing vibrations which are transmitted from the shifting shaft support portion to an upper portion of the outer housing wall of the casing, whereby a gear noise is generated due to the gear-meshing vibrations. This gear noise would give a significant discomfort to a vehicle operator and passengers within compartments of the vehicle. In the power transmitting system according to the present invention, however, the fixing portion which receives the reaction force from the reverse drive brake is located in the portion of the circumference of the brake retaining portion which is outside the predetermined circumferential portion being close to the shifting shaft support portion, so that the vibrations to be transmitted to the upper portion of the outer housing wall through the shifting shaft support portion are reduced, whereby the generation of the noise due to the vibrations is effectively reduced. Accordingly, the NV-free performance of the vehicular power transmitting system is improved.

According to the fourth mode of the invention, the reverse drive brake is the friction brake including the casing-side friction members and the gear-side friction members, and the recessed/raised portion formed on the inner circumferential surface of the brake retaining portion functions as the fixing portion to fix the casing-side friction members such that the casing-side friction members are not rotatable. The recessed/raised portion of the brake retaining portion is located in the portion of the circumference of the brake retaining portion which is outside the predetermined circumferential portion, whereby it is possible to effectively reduce the vibrations to be transmitted to the predetermined circumferential portion of the brake retaining portion, namely, to be transmitted toward the shifting shaft support portion.

DETAILED DESCRIPTION OF PREFERRED EMBODIMENTS

Figure 1:
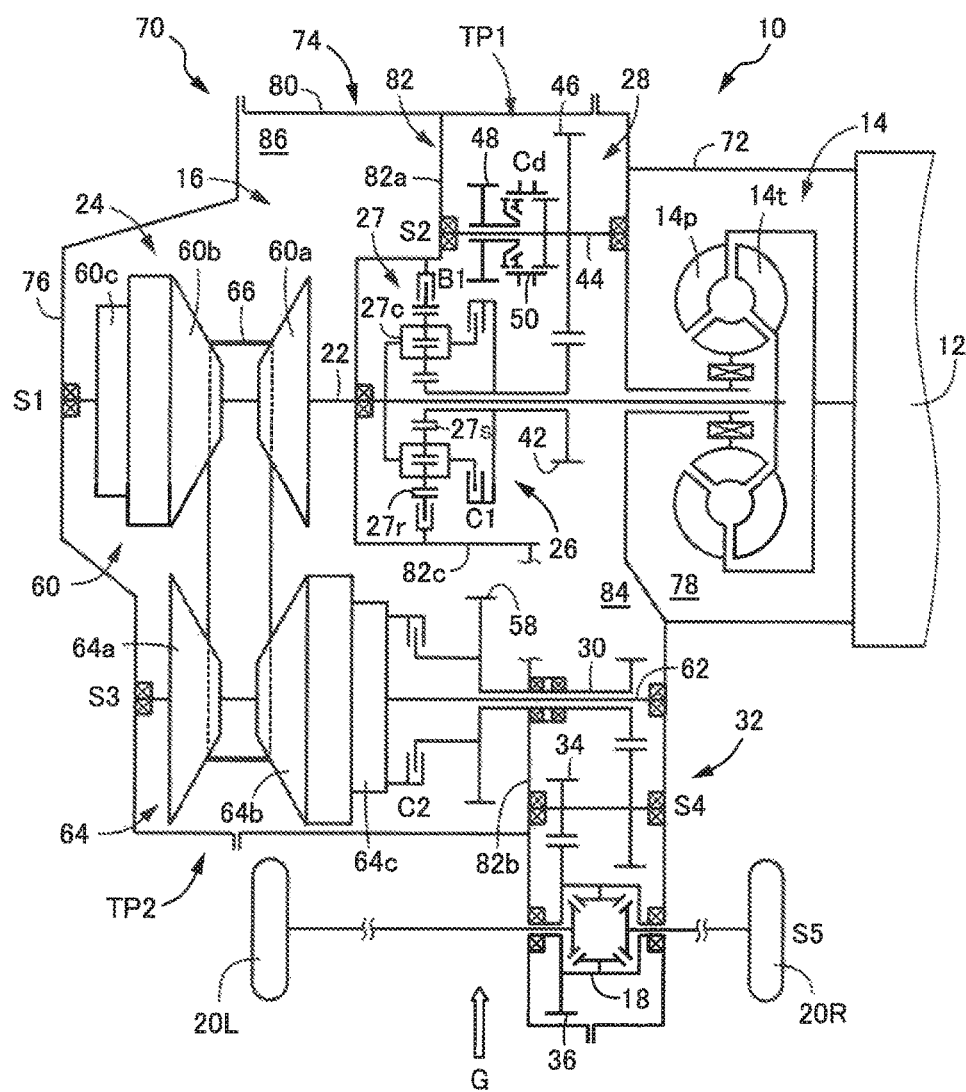
FIG. 1 is a schematic view showing a vehicular power transmitting system according to one embodiment of this invention.

The present invention is preferably applicable to a vehicular power transmitting system having not only a first power transmitting path through which a vehicle drive force is transmitted through the forward/reverse switching device and the gear type transmission mechanism, but also a second power transmitting path through which the vehicle drive force is transmitted through a belt-and-pulley type continuously variable transmission. However, the vehicular power transmitting system according to the invention need not be provided with the second power transmitting path. The vehicle driving power source may be selected from various forms of drive power source such as an internal combustion engine, an electric motor, and a combination of the engine and the electric motor. The forward/reverse switching device of the planetary gear type has three rotary elements consisting of a sun gear, a carrier rotatably supporting a planetary gear, and a ring gear. One of the rotary elements the rotating speed of which is intermediate between those of the other two rotary elements is used as the selectively fixed rotary element. Described in detail, the carrier is used as the selectively fixed rotary element where the planetary gear set is of a single-pinion type, and the ring gear is used as the selectively fixed rotary element where the planetary gear set is of a double-pinion type.

The predetermined circumferential portion of the circumference of the brake retaining portion is defined by the pair of tangential lines which are tangent to the circumference of the shifting shaft and which are parallel to the straight line connecting the first and second axes and located on the respective opposite sides of the straight line. The fixing portion of the brake retaining portion is not located at least in this predetermined circumferential portion. An angular range of the circumferential portion in which the fixing portion is inhibited from being located may be wider than an angular range of the above-indicated predetermined circumferential portion. Where the reverse drive brake is a friction brake provided with casing-side friction members and gear-side friction members, a recessed/raised portion (comprised of a recessed groove(s) and a convex tooth (teeth)) provided on an inner circumferential surface of the brake retaining portion as the fixing portion may be splined with the casing-side friction members such that the casing-side friction members are axially movable relative to and rotatable together with the recessed/raised portion. However, the casing-side friction members may be screwed to the fixing portion or otherwise integrally fixed to the fixing portion. The reverse drive brake may be the friction brake of a single disc type or multiple-disc type, or alternatively a dog-type or meshing-type brake. Where the reaction force of the reverse drive brake is received by mutual engagement of grooves (recessed portions) formed in the brake retaining portion and teeth (raised portions) of the reverse drive brake, mutually contacting circumferential parts of the grooves and the teeth are considered to function as the fixing portion, in a strict sense, and these mutually engaging grooves and teeth which receive the reaction force of the reverse drive brake are located outside the predetermined circumferential portion of the circumference of the brake retaining portion.

For example, the output shaft of the vehicular power transmitting system is provided with a driven gear, as a driven portion, to which the drive power is transmitted from the gear type transmission mechanism. However, the output shaft may be provided with a sprocket to which the drive force is transmitted through a chain. The present invention is suitably applicable to a vehicular power transmitting system in which the second axis on which the shifting shaft is disposed is positioned above the first axis as seen in the vertical direction of the vehicle in question, and the vibrations are transmitted to an upper portion of the outer housing wall of the casing through the shifting shaft support portion. However, the present invention is also suitably applicable to a vehicular power transmitting system in which the second axis is positioned on one side of the first axis on the side of driver/passenger compartments of a vehicle as seen in the running or longitudinal direction of the vehicle, and the vibrations are transmitted to a portion of the outer housing wall of the casing on the side of the driver/passenger compartments. The shifting shaft support portion is provided with a bearing by which the shifting shaft is supported rotatably about the second axis. However, where the shifting shaft is provided with a gear rotatable relative to the shifting shaft, the shifting shaft support portion may be configured to fix the shifting shaft to the partition wall such that the shifting shaft is not rotatable relative to the partition wall.

EMBODIMENT

A preferred embodiment of this invention will be described in detail by reference to the drawings. It is noted that the drawings are simplified or transformed as needed, and do not necessarily accurately represent the dimensions and shapes of various elements of the embodiment.

Figure 3:
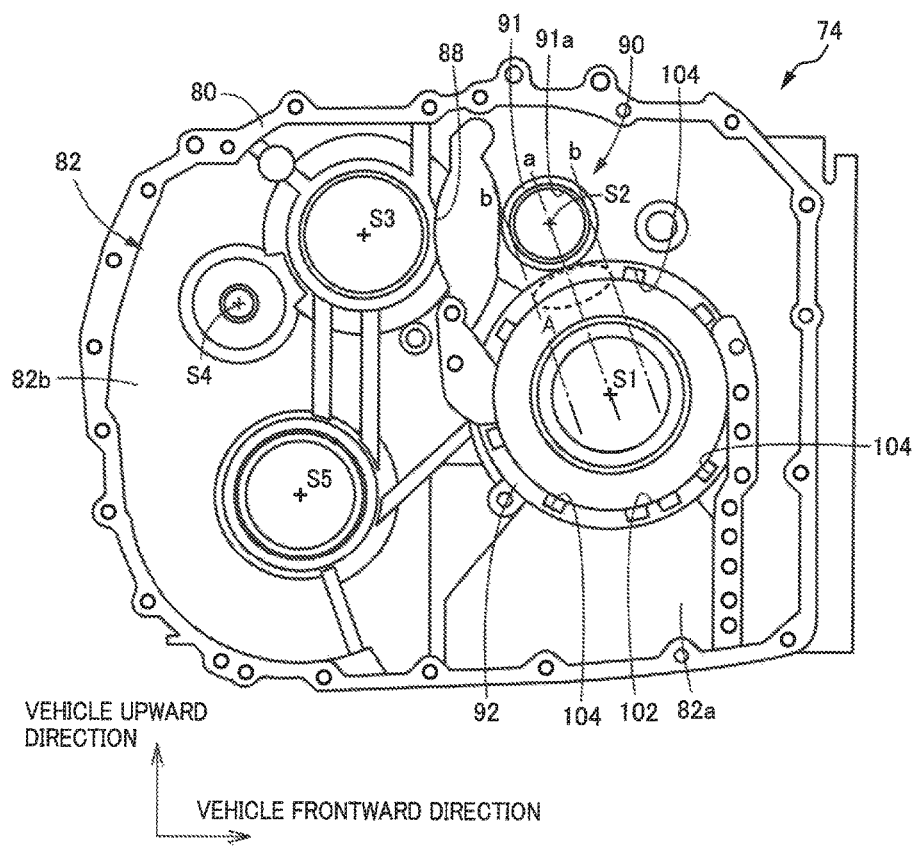
FIG. 3 is a schematic right-side elevational view of the casing of FIG. 2.

Reference is first made to FIG. 1, which is the schematic view showing a vehicular power transmitting system 10 according to one embodiment of this invention, such that a plurality of mutually parallel axes of the vehicular power transmitting system 10 lie in one plane. This vehicular power transmitting system 10 is a transaxle of a transverse type the plurality of axes of which are parallel to a width or transverse direction of a vehicle provided with the vehicular power transmitting system 10. In the present embodiment, the vehicular power transmitting system 10 is provided on an FF (front-engine front-drive) vehicle. The vehicle is provided with a vehicle driving power source in the form of an internal combustion engine 12, and an output of the engine 12 is transmitted from a fluid-operated power transmitting device in the form of a torque converter 14 to a differential gear device 18 through an automatic transmission 16, and is distributed to left and right front wheels (drive wheels) 20L and 20R. The vehicular power transmitting system 10 has first through fifth axes S1-S5 which are substantially parallel to the width or transverse direction of the vehicle and which are positioned relative to each other as shown in FIG. 3. The engine 12 and the torque converter 14 are disposed on the first axis S1, while the differential gear device 18 is disposed on the fifth axis S5. The torque converter 14 includes a pump impeller 14p connected to a crankshaft of the engine 12, and a turbine impeller 14t connected to an input shaft 22 of the automatic transmission 16. The torque converter 14 transmits a drive force of the engine 12 from the pump impeller 14p to the turbine impeller 14t through a fluid.

The automatic transmission 16 includes: the input shaft 22 provided integrally with an output rotary member of the torque converter 14 in the form of the turbine shaft 14t; a belt-and-pulley type continuously variable transmission 24 connected to the input shaft 22; a forward/reverse switching device 26 and a gear type transmission mechanism 28 which are also connected to the input shaft 22 and which are disposed in parallel with the belt-and-pulley type continuously variable transmission 24; an output shaft 30 which is a common output rotary member of the belt-and-pulley type continuously variable transmission 24 and the gear type transmission mechanism 28; and a speed reducing gear device 32. The speed reducing gear device 32 has a small-diameter gear 34 which meshes with a ring gear 36 of the differential gear device 18. The input shaft 22, the forward/reverse switching device 26 and a primary pulley 60 of the belt-and-pulley type continuously variable transmission 24 are disposed on the first axis S1, and the gear type transmission mechanism 28 is disposed on the first axis S1 and the second axis S2 parallel to the first axis S1, while a secondary pulley 64 of the belt-and-pulley type continuously variable transmission 24 and the output shaft 30 are disposed on the third axis S3 parallel to the first and second axes S1 and S2. Further, the speed reducing gear device 32 is disposed on the third axis S3 and the fourth axis S4 parallel to the third axis S3. In the thus constructed automatic transmission 16, an output (a drive force) of the engine 12 is transmitted from the torque converter 14 to the output shaft 30 through the belt-and-pulley type continuously variable transmission 24, or not through the continuously variable transmission 24 but through the forward/reverse switching device 26 and the gear type transmission mechanism 28. The output of the engine 12 is then transmitted to the left and right front wheels 20L and 20R through the speed reducing gear device 32 and the differential gear device 18.

Namely, the automatic transmission 16 in the present embodiment has a first power transmitting path TP1 through which the output of the engine 12 is transmitted from the input shaft 22 to the output shaft 30 through the forward/reverse switching device 26 and the gear type transmission mechanism 28, and a second power transmitting path TP2 through which the output of the engine 12 is transmitted to the output shaft 30 through the belt-and-pulley type continuously variable transmission 24. The power transmitting path is switched between the first and second power transmitting paths TP1 and TP2, according to a running condition of a vehicle provided with the vehicular power transmitting system 10. To this end, the automatic transmission 16 is provided with a first connecting/disconnecting device in the form of a forward drive clutch C1 and reverse drive brake B1 for placing the first power transmitting path TP1 selectively in a power transmitting state and a power cut-off state, and a second connecting/disconnecting device in the form of a belt driving clutch C2 for placing the second power transmitting path TP2 selectively in a power transmitting state and a power cut-off state. In the first power transmitting path TP1, the automatic transmission 16 is further provided with a dog type connecting/disconnecting device in the form of a dog clutch Cd disposed in series with the forward drive clutch C1 and the gear type transmission mechanism 28, more specifically, disposed downstream of the clutch C1 and transmission mechanism 28. The first power transmitting path TP1 is a path through which the drive force is transmitted to the output shaft 30 through the forward/reverse switching device 26 and the gear type transmission mechanism 28.

The forward/reverse switching device 26 is principally constituted by a planetary gear set 27 of a double-pinion type, and has a carrier 27c integrally connected to the input shaft 22, a sun gear 27s connected to a small-diameter gear 42 disposed coaxially with and rotatably relative to the input shaft 22, and a ring gear 27r a rotary motion of which is selectively stopped by the reverse drive brake B1. The carrier 27c and the sun gear 27s are selectively connected to each other through the forward drive clutch C1. When the forward drive clutch C1 is placed in its engaged state while the reverse drive brake B1 is placed in its released state, the input shaft 22 is connected directly to the small-diameter gear 42, so that the forward/reverse switching device 26 is placed in a forward drive position (forward drive gear position). When the reverse drive brake B1 is placed in its engaged state while the forward drive clutch C1 is placed in its released state, the small-diameter gear 42 is rotated in a direction opposite to the direction of rotation of the input shaft 22, so that the forward/reverse switching device 26 is placed in a reverse drive position (reverse drive gear position). When the forward drive clutch C1 and the reverse drive brake B1 are both placed in their released states, the forward/reverse switching device 26 is placed in a neutral state in which a drive force is not transmitted through the forward/reverse switching device 26. Each of the forward drive clutch C1 and the reverse drive brake B1 is a frictional coupling device of a multiple-disc type having a plurality of friction members which are frictionally engageable with each other by a hydraulic cylinder. It is noted that the ring gear 27r corresponds to a selectively fixed rotary element of the planetary gear set 27, which is selectively held stationary to place the forward/reverse switching device 26 in the reverse drive position.

The gear type transmission mechanism 28 has the small-diameter gear 42, a large-diameter gear 46 and an idler gear 48 having a relatively small diameter. The large-diameter gear 46 is mounted on a shifting shaft 44 disposed on the second axis S2 such that the large-diameter gear 46 is rotated together with the shifting shaft 44, and is held in meshing engagement with the small-diameter gear 42. The idler gear 48 is also mounted on the shifting shaft 44 such that the idler gear 48 is axially movable relative to the shifting shaft 44. Between the shifting shaft 44 and the idler gear 48, there is disposed the dog clutch Cd, to selectively connect and disconnect the shifting shaft 44 and the idler gear 48 to and from each other. The dog clutch Cd is provided with a synchro-mesh mechanism (synchronizing mechanism) such as a synchronizer ring, and is configured such that an axial moment of a clutch hub sleeve 50 by a hydraulic cylinder or any other switching device in a leftward direction (as seen in FIG. 1) for connecting the shifting shaft 44 and the idler gear 48 causes a synchronizing rotary motion of the idler gear 48 with the shifting shaft 44 through a synchronizer ring, and a further axial movement of the clutch hub sleeve 50 causes connection of the idler gear 48 to the shifting shaft 44 through spline teeth formed in an inner circumferential surface of the clutch hub sleeve 50.

The idler gear 48 is held in meshing engagement with a large-diameter driven gear 58 mounted on the output shaft 30. When one of the forward drive clutch C1 and the reverse drive brake B1 is placed in its engaged state while the dog clutch Cd is placed in its engaged state, the output of the engine 12 is transmitted through the first power transmitting path TP1, from the input shaft 22 to the output shaft 30 through the forward/reverse switching device 26, the gear type transmission mechanism 28, the idler gear 48 and the driven gear 58, in this order of description. It is noted that the driven gear 58 corresponds to a driven portion of the output shaft 30. It is further noted that the small-diameter idler gear 48 and the large-diameter driven gear 58 cooperate to also function to change (lower) the speed ratio of the vehicular power transmitting system 10. In this respect, the gear type transmission mechanism 28 may be considered to include the driven gear 58 as well as the idler gear 48.

The belt-and-pulley type continuously variable transmission 24 includes: a primary pulley 60 which is connected to the input shaft 22 and an effective diameter of which is variable; a secondary pulley 64 which is connected to a pulley shaft 62 coaxial with the output shaft 30 and an effective diameter of which is variable; and a transmission belt 66 connecting the primary and secondary pulleys 60 and 64. The continuously variable transmission 24 transmits a drive force between the primary and secondary pulleys 60 and 64, through frictional contact of the transmission belt 66 with the pulleys 60 and 64. The primary and secondary pulleys 60 and 64 have: respective stationary sheaves 60a and 64a operatively connected to the input shaft 22 and the pulley shaft 62, respectively; respective movable sheaves 60b and 64b disposed such that the movable sheaves 60b and 64b are rotated with and axially movable relative to the input shaft 22 and the pulley shaft 62, respectively; and respective hydraulic actuators in the form of hydraulic cylinders 60c and 64c to apply thrust forces to the movable sheaves 60b and 64b, respectively, for changing effective widths of Vee-grooves defined between the stationary sheaves 60a, 64a and the movable sheaves 60b and 64b. The effective widths of the Vee-grooves of the primary and secondary pulleys 60 and 64 are changed by controlling a primary hydraulic pressure to be applied to the hydraulic cylinder 60c, for example, so that the effective diameters of the primary and secondary pulleys 60 and 64 engaging the transmission belt 66 are accordingly changed, whereby a speed ratio of the continuously variable transmission 24 is continuously changed. Further, a tension of the transmission belt 66 is adjusted by controlling a secondary hydraulic pressure to be applied to the hydraulic cylinder 64c so as not to cause a slip of the transmission belt 66.

The output shaft 30 is disposed coaxially with the pulley shaft 62 such that the output shaft 30 is rotatable relative to the pulley shaft 62. The output shaft 30 and the secondary pulley 64 are selectively connected and disconnected to and from each other, with respective engaging and releasing actions of the belt driving clutch C2 disposed between the output shaft 30 and the secondary pulley 64. Namely, when the belt driving clutch C2 is placed in its engaged state, the output of the engine 12 is transmitted from the input shaft 22 to the output shaft 30 through the belt-and-pulley type continuously variable transmission 24, that is, through the second power transmitting path TP2. The belt driving clutch C2 is a frictional coupling device of a multiple-disc type having a plurality of friction members which are selectively brought into frictional engagement with each other by a hydraulic cylinder.

The vehicular power transmitting system 10 is provided with a transaxle case 70 integrally fixed to the engine 12 and attached to a body of the vehicle through an attachment bracket. The transaxle case 70 is constituted by three members in the form of a housing 72, a casing 74 and a rear cover 76, which have outward flanges at their axial ends. Those three members are assembled with the outward flanges being held in abutting contact with each other and integrally fixed to each other with a multiplicity of bolts. The housing 72 is integrally fixed to the engine 12, and cooperates with the engine 12 to define a first accommodation space 78 in which the torque converter 14 is accommodated. The casing 74 has an outer housing wall 80 of cylindrical shape, and a partition wall 82 which extends inwardly from an axially middle portion of the outer housing wall 80, such that the partition wall 82 is generally perpendicular to the first through fifth axes S1-S5. The housing 72 and the partition wall 82 define therebetween a second accommodation space 84 accommodating the forward/reverse switching device 26, the gear type transmission mechanism 28, the speed reducing gear device 32 and the differential gear device 18. Further, the rear cover 76 and the partition wall 82 define therebetween a third accommodation space 86 accommodating the belt-and-pulley type continuously variable transmission 24, the belt driving clutch C2 and the driven gear 58.

Figure 2:
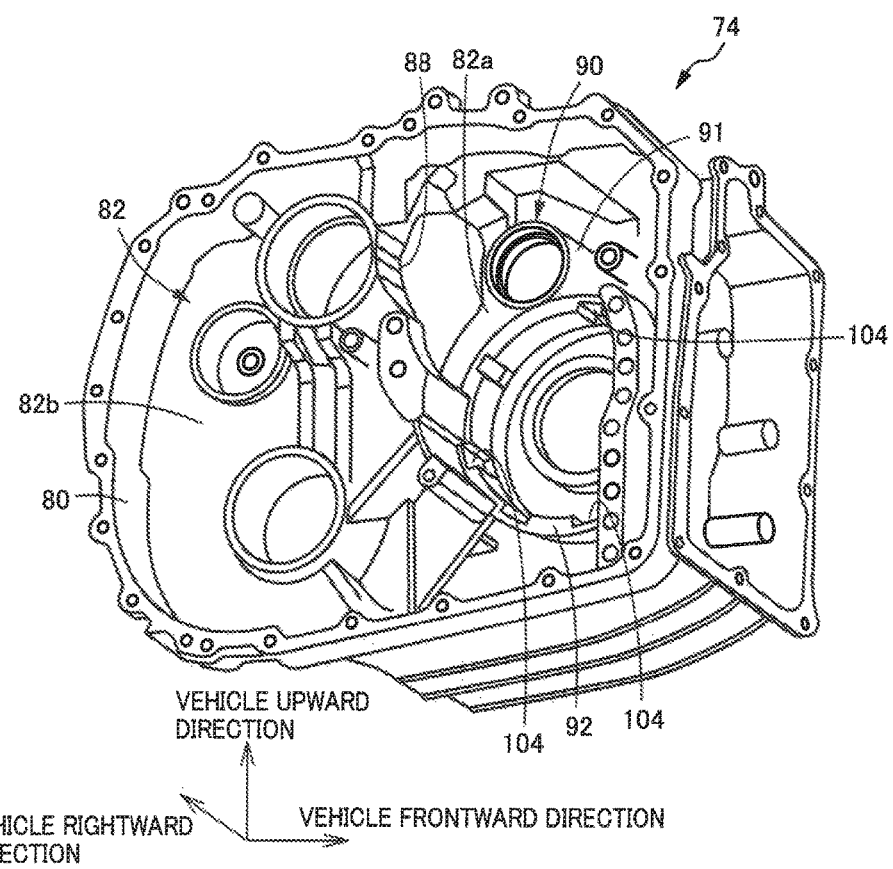
FIG. 2 is a schematic perspective view showing a casing of the vehicular power transmitting system of FIG. 1.

FIG. 2 is the perspective view which shows the casing 74 as seen from the side of the housing 72, namely, obliquely upwards and leftwards from the side of the engine 12, while FIG. 3 is an elevational view of the casing 74 as seen in a direction parallel to the axes S1-S5, more specifically, a right-side elevational view as seen from the side of the engine 12. As is apparent from FIG. 3, the second axis S2 is located above the first axis S1 in the vertical direction of the vehicle, namely, between the outer housing wall 80 and the first axis S1, and is offset by a small distance from the first axis S1 in the rearward direction of the vehicle. The third axis S3 is located rearwards of the second axis S2, and the fourth axis S4 is located rearwards and downwards of the third axis S3, while the fifth axis S5 is located between and downwards of the third and fourth axes S3 and S4. The partition wall 82 of the casing 74 includes: a first wall portion 82a located in a front part of the casing 74 in which the first and second axes S1 and S2 are located; a second wall portion 82b located in a rear part of the casing 74 in which the third through fifth axes S3-S5 are located; and a stepped wall portion 82c (shown in FIGS. 1 and 4) located between the first and second wall portions 82a and 82b, which are spaced apart from each other in the axial direction of the vehicular power transmitting system 10, that is, in the width direction of the vehicle. Namely, the first wall portion 82a is offset from a position G of mutual meshing engagement of the idler gear 48 and the driven gear 58 (indicated in FIG. 1), in a direction toward the rear cover 76 (in the left direction of the vehicle), so that the gear type transmission mechanism 28 including the idler gear 48 and the forward/reverse switching device 26 are accommodated within the second accommodation space 84, and the second wall portion 82b is offset from the position G in a direction toward the engine 12 (in the right direction of the vehicle), so that the driven gear 58 and the belt driving clutch C2 are accommodated within the third accommodation space 86. The stepped wall portion 82c between the first and second wall portions 82a and 82b has a communication aperture 88 formed through its part between the second and third axes S2 and S3, to permit the idler gear 48 and the driven gear 58 to mesh with each other for transmitting the drive force.

Figure 4:
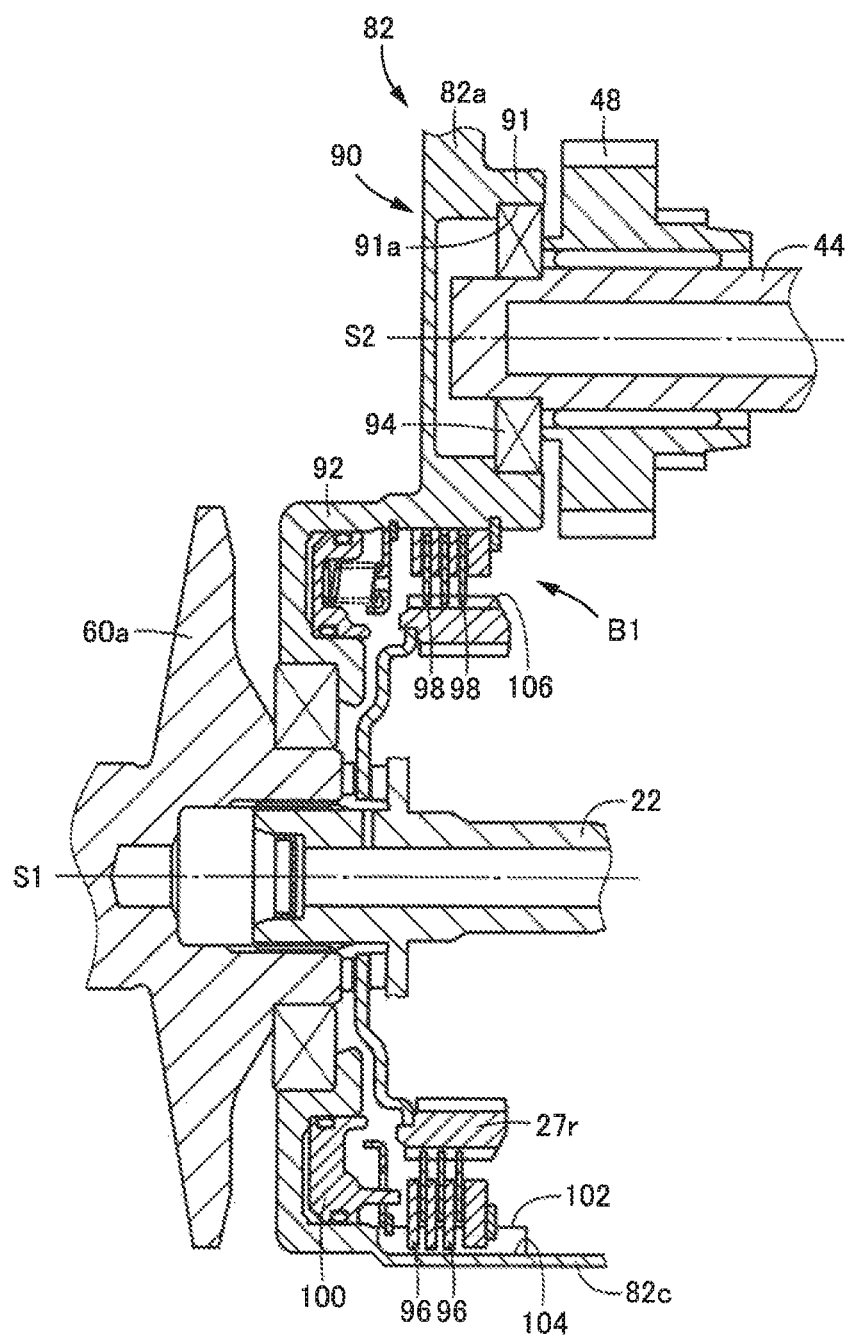
FIG. 4 is a cross sectional view showing details of a reverse drive brake and a shifting shaft support portion shown in FIG. 1, and their vicinities.

FIG. 4 is the cross sectional view showing details of a part of the first wall portion 82a of the partition wall 82, that is, a shifting shaft support portion 90 for supporting the shifting shaft 44 rotatably about the second axis S2, a brake retaining portion 92 at which the reverse drive brake B1 is retained, for fixing the ring gear 27r to prevent its rotary motion about the first axis S1, and vicinities of the shifting shaft support portion 90 and the brake retaining portion 92. The shifting shaft support portion 90 includes a cylindrical protrusion 91 which is formed coaxially with the second axis S2 and integrally with the first wall portion 82a, and which supports the shifting shaft 44 through a bearing 94 rotatably about the second axis S2. The brake retaining portion 92 is a cylindrical part which is formed coaxially with the first axis S1 and integrally with the first wall portion 82a, and in which the reverse drive brake B1 is disposed. The reverse drive brake B1 is a friction brake of a multiple-disc type having a plurality of casing-side friction members 96 and a plurality of gear-side friction members 98, which are axially forced against each other by a piston 100, for frictional engagement with each other. Each of the casing-side friction members 96 has a multiplicity of teeth formed in its radially outer portion and spaced apart from each other in its circumferential direction. The teeth of the casing-side friction member 96 are held in spline-engagement with a multiplicity of grooves 104 formed in an inner circumferential surface 102 of the brake retaining portion 92, whereby the casing-side friction members 96 are disposed on the brake retaining portion 92 such that the casing-side friction members 96 are not rotatable about the first axis S1 and are axially movable relative to the brake retaining portion 92. On the other hand, each of the gear-side friction members 98 has a multiplicity of teeth formed in its radially inner portion and spaced apart from each other in its circumferential direction. The teeth of the gear-side friction members 98 are held in spline-engagement with a multiplicity of grooves 106 formed in an outer circumferential surface of the ring gear 27r, whereby the gear-side friction members 98 are disposed on the ring gear 27r such that the gear-side friction members 98 are not rotatable about the first axis S1 and are axially movable relative to the ring gear 27r. When the casing-side friction members 96 and the gear-side friction members 98 are forced against each other by the piston 100, for frictional engagement with each other, the ring gear 27r is fixed to the brake retaining portion 92 so that the ring gear 27r is not rotatable about the first axis S1, whereby the forward/reverse switching device 26 is placed in the reverse drive position. The grooves 104 and 106 indicated above correspond to recessed/raised portions, and the grooves 104 formed in the inner circumferential surface 102 of the brake retaining portion 92 correspond to a fixing portion which receives a reaction force from the casing-side friction members 96. It is noted that the brake retaining portion 92 and the ring gear 27r may have teeth. In this case, the friction members 96 and 98 have grooves.

When the forward/reverse switching device 26 is placed in the reverse drive position with the ring gear 27r being selectively fixed to the brake retaining portion 92 with the reverse drive brake gear-meshing vibrations originally generated due to meshing engagement of the gears of the planetary gear set 27 are transmitted from the reverse drive brake B1 to the brake retaining portion 92, and are further transmitted from the partition wall 82 to the outer housing wall 80 so that a noise may be generated. In this respect, it is noted that the shifting shaft support portion 90 disposed between the outer housing wall 80 and the brake retaining portion 92 has a comparatively high degree of rigidity, so that the vibrations transmitted to the brake retaining portion 92 are likely to be transmitted to the outer housing wall 80 through the shifting shaft support portion 90. It is particularly noted that the communication aperture 88 is formed through a part of the partition wall 82 near the shifting shaft support portion 90, that is, through the stepped wall portion 82c located between the second and third axes S2 and S3. In the presence of this communication aperture 88, the vibrations would be likely to be transmitted through the shifting shaft support portion 90 located near the communication aperture 88, and the rigidity of the outer housing wall 80 is reduced, so that a considerable noise would be generated. Further, the second axis S2 is located above the first axis S1 in the vertical direction of the vehicle, so that the gear-meshing vibrations of the planetary gear set 27 are transmitted from the shifting shaft support portion 90 to an upper portion of the outer housing wall 80, whereby the noise is generated due to the gear-meshing vibrations. This noise would give a significant discomfort to a vehicle operator and passengers within compartments of the vehicle, giving rise of a problem of deterioration of an NV-free (noise/vibration-free) performance of the vehicular power transmitting system 10.

In the present embodiment, however, the plurality of grooves 104 (more precisely, eight grooves 104 in the specific example of FIG. 3) which receive the reaction force from the reverse drive brake B1 are located in a portion of a circumference of the brake retaining portion 92 about the first axis S1, which portion is outside a predetermined circumferential portion A, as shown in FIG. 3. This predetermined circumferential portion A in which the grooves 104 are inhibited from being located about the first axis S1 corresponds to the shifting shaft support portion 90 in a circumferential direction of the brake retaining portion 92. The circumferential portion A, which is indicated by a broken line in FIG. 3, is defined by a pair of tangential lines b which are tangent to a circumference of the shifting shaft 44 supported by the shifting shaft support portion 90 and which are parallel to a straight line a connecting the first and second axes S1 and S2 and located on opposite sides of the straight line a, as seen in a plane normal to the first axis S1, that is, as seen in the side elevational view of FIG. 3. The shifting shaft support portion 90 is configured to support the shifting shaft 44 at a bearing support portion 91a which has a stepped inner circumferential surface at distal portion of the cylindrical protrusion 91 and which supports the bearing 94. It is noted that the reaction force of the reverse drive brake B1 is received by one of a pair of opposite side walls of each of the grooves 104. This one side wall is the wall with which the teeth of the corresponding casing-side friction members 96 are brought into abutting contact when the reverse drive brake B1 is brought into its engaged state. The gear-meshing vibrations are transmitted through the above-indicated side wall of each groove 104. According to the present invention, the grooves 104 are formed such that the above-indicated side wall is not located within the predetermined circumferential portion A of the brake retaining portion 92 about the first axis S1.

Thus, the vehicular power transmitting system 10 according to the present embodiment is configured such that the forward/reverse switching device 26 is placed in the reverse drive position when the ring gear 27r of the planetary gear set 27 is fixed to the brake retaining portion 92 with the reverse drive brake B1 retained on the brake retaining portion 92 of the partition wall 82. However, the grooves 104 which receive the reaction force from the reverse drive brake B1, in other words, the grooves 104 to which gear-meshing vibrations of the planetary gear set 27 are transmitted, are located in the portion of the circumference of the brake retaining portion 92 about the first axis S1, which portion is outside the predetermined circumferential portion A which is close to the shifting shaft support portion 90 in the circumferential direction of the brake retaining portion 92 and in which the grooves 104 are inhibited from being located about the first axis S1. Accordingly, the gear-meshing vibrations of the planetary gear set 27 which are generated during running of the vehicle in the reverse drive position and which are transmitted to the outer housing wall 80 of the casing 74 through the shifting shaft support portion 90 are reduced, so that the noise generated due to the vibrations of the outer housing wall 80 is reduced to improve the NV-free performance of the vehicular power transmitting system 10. In particular, it is noted that the predetermined circumferential portion A is defined by the pair of tangential lines b which are tangent to the circumference of the shifting shaft 44 (bearing support portion 91a) supported by the shifting shaft support portion 90 and which are parallel to the straight line a connecting the first and second axes S1 and S2 and located on the opposite sides of the straight line a, as seen in the plane normal to the first axis S1. Therefore, the vibrations transmitted to the shifting shaft support portion 90 are effectively reduced.

The present vehicular power transmitting system 10 is further configured such that the communication aperture 88 is formed through the part of the stepped wall portion 82c of the partition wall 82 which is located between the second axis S2 and the third axis S3. In the presence of this communication aperture 88, vibrations would be likely to be transmitted through the shifting shaft support portion 90 located near the communication aperture 88, and the rigidity of the outer housing wall 80 of the casing 74 is reduced, so that a considerable noise would be generated. In the present vehicular power transmitting system 10, however, the grooves 104 which receive the reaction force from the reverse drive brake B1 are located in the portion of the circumference of the brake retaining portion 92 which is outside the predetermined circumferential portion A, so that the vibrations to be transmitted to the outer housing wall 80 through the shifting shaft support portion 90 are reduced, whereby the generation of the noise due to the vibrations is effectively reduced.

The present vehicular power transmitting system 10 is also configured such that the second axis S2 is located above the first axis S1 in the vertical direction of the vehicle. The planetary gear set 27 generates gear-meshing vibrations which are transmitted from the shifting shaft support portion 90 to an upper portion of the outer housing wall 80 of the casing 74, whereby a gear noise is generated due to the gear-meshing vibrations. This gear noise would give a significant discomfort to a vehicle operator and passengers within compartments of the vehicle. In the present vehicular power transmitting system 10, however, the grooves 104 which receive the reaction force from the reverse drive brake B1 are located in the portion of the circumference of the brake retaining portion 92 which is outside the predetermined circumferential portion A being close to the shifting shaft support portion 90, so that the vibrations to be transmitted to the upper portion of the outer housing wall 80 through the shifting shaft support portion 90 are reduced, whereby the generation of the noise due to the vibrations is effectively reduced. Accordingly, the NV-free (noise/vibration-free) performance of the vehicular power transmitting system 10 is improved.

The present vehicular power transmitting system 10 is further configured such that the reverse drive brake B1 is the friction brake having the casing-side friction members 96 and the gear-side friction members 98, and such that the grooves 104 formed in the inner circumferential surface 102 of the brake retaining portion 92 function as the fixing portion to fix the casing-side friction members 96 such that the casing-side friction members 96 are not rotatable. The grooves 104 are located in the portion of the circumference of the brake retaining portion 92 which is outside the predetermined circumferential portion A, whereby it is possible to effectively reduce the vibrations to be transmitted to the predetermined circumferential portion. A of the brake retaining portion 92, namely, to be transmitted toward the shifting shaft support portion 90.

While the preferred embodiment of this invention has been described above in detail, for illustrative purpose only, it is to be understood that the invention may be embodied with various changes and improvements, which may occur to those skilled in the art.

NOMENCLATURE OF ELEMENTS

10: Vehicular power transmitting system
12: Engine (Vehicle driving power source)
24: Belt-and-pulley type continuously variable transmission
26: Forward/reverse switching device
27: Planetary gear set
   27r: Ring gear (Selectively fixed rotary element)
28: Gear type transmission mechanism
30: Output shaft
44: Shifting shaft
58: Driven gear (Driven portion)
60: Primary pulley
64: Secondary pulley
74: Casing
80: Outer housing wall
82: Partition wall
   82c: Stepped wall portion
88: Communication aperture
90: Shifting shaft support portion
   91a: Bearing support portion (Support position)
92: Brake retaining portion
96: Casing-side friction members
98: Gear-side friction members
102: Inner circumferential surface
104: Grooves (Recessed/raised portion; Fixing portion)
106: Grooves (Recessed/raised portion)
S1: First axis
S2: Second axis
S3: Third axis
TP1: First power transmitting path (Power transmitting path)

TP2: Second power transmitting path (Power transmitting path)
B1: Reverse drive brake
C2: Belt driving clutch
A: Predetermined circumferential portion
a: Straight line
b: Tangential lines

What is claimed is:

1. A vehicular power transmitting system: comprising a forward/reverse switching device of a planetary gear type disposed on a first axis and including a reverse drive brake; and a gear type transmission mechanism disposed on the first axis and a second axis parallel to the first axis and having a shifting shaft disposed on the second axis, the vehicular power transmitting system including a power transmitting path through which a drive force of a vehicle driving power source is transmitted to an output shaft disposed on a third axis parallel to the second axis, through the forward/reverse switching device and the gear type transmission mechanism, the vehicular power transmitting system further comprising:

a casing which comprises an outer housing wall having cylindrical shape and in which the second axis is positioned between the outer housing wall and the first axis;

the casing further comprising a partition wall which is formed integrally with the outer housing wall, so as to extend from the outer housing wall radially inwardly of the outer housing wall, the partition wall including a brake retaining portion at which the reverse drive brake of the forward/reverse switching device is retained, the partition wall further including a shifting shaft support portion which is disposed between the brake retaining portion and the outer housing wall and by which the shifting shaft of the gear type transmission mechanism is supported;

the forward/reverse switching device including a planetary gear set having a selectively fixed rotary element, and being configured to be placed in a reverse drive position when the selectively fixed rotary element is fixed with the reverse drive brake; and the brake retaining portion including a fixing portion which receives a reaction force from the reverse drive brake, the fixing portion being located in a portion of a circumference of the brake retaining portion, which portion is outside a predetermined circumferential portion of the circumference which is close to the shifting shaft support portion in a circumferential direction of the brake retaining portion about the first axis and in which the fixing portion is inhibited from being located, the predetermined circumferential portion being defined by a pair of tangential lines which are tangent to a circumference of the shifting shaft supported by the shifting shaft support portion and which are parallel to a straight line connecting the first and second axes and located on opposite sides of the straight line, as seen in a plane normal to the first axis.

2. The vehicular power transmitting system according to claim 1, further comprising a belt-and-pulley type continuously variable transmission which has a primary pulley disposed on the first axis and a secondary pulley disposed on the third axis, and which is disposed in parallel with the power transmitting path, the drive force of the vehicle driving power source being transmitted through the continuously variable transmission to the output shaft such that a speed ratio of the vehicular power transmitting system is continuously changed by the continuously variable transmission, and wherein the drive force is transmitted from the secondary pulley to the output shaft through a belt driving clutch, and the output shaft is provided with a driven portion to which the drive force is transmitted from the gear type transmission mechanism, and further wherein the partition wall has a stepped wall portion formed such that the belt-and-pulley type continuously variable transmission, the belt driving clutch and the driven portion are disposed on one of opposite sides of the partition wall while the forward/reverse switching device and the gear type transmission mechanism are disposed on the other side of the partition wall, the stepped wall portion having a communication aperture formed between the second and third axes, to permit the drive force to be transmitted from the gear type transmission mechanism to the driven portion.

3. The vehicular power transmitting system according to claim 2, wherein the second axis is located above the first axis in a vertical direction of a vehicle provided with the vehicular power transmitting system.

4. The vehicular power transmitting system according to claim 3, wherein the reverse drive brake is a friction brake including casing-side friction members engaged with an inner circumferential surface of the brake retaining portion through a recessed/raised portion formed on the inner circumferential surface such that the casing-side friction members are not rotatable, and gear-side friction members engaged with the selectively fixed rotary element of the planetary gear set through a recessed/raised portion formed on the selectively fixed rotary element such that the gear-side friction members are rotated together with the selectively fixed rotary element, the casing-side friction member and the gear-side friction members being frictionally engaged with each other to fix the selectively fixed rotary element to the brake retaining portion, and wherein the recessed/raised portion of the inner circumferential surface of the brake retaining portion which engages the casing-side friction members such that the casing-side friction members are not rotatable functions as the fixing portion.

5. The vehicular power transmitting system according to claim 2, wherein the reverse drive brake is a friction brake including casing-side friction members engaged with an inner circumferential surface of the brake retaining portion through a recessed/raised portion formed on the inner circumferential surface such that the casing-side friction members are not rotatable, and gear-side friction members engaged with the selectively fixed rotary element of the planetary gear set through a recessed/raised portion formed on the selectively fixed rotary element such that the gear-side friction members are rotated together with the selectively fixed rotary element, the casing-side friction member and the gear-side friction members being frictionally engaged with each other to fix the selectively fixed rotary element to the brake retaining portion, and wherein the recessed/raised portion of the inner circumferential surface of the brake retaining portion which engages the casing-side friction members such that the casing-side friction members are not rotatable functions as the fixing portion.

6. The vehicular power transmitting system according to claim 1, wherein the second axis is located above the first axis in a vertical direction of a vehicle provided with the vehicular power transmitting system.

7. The vehicular power transmitting system according to claim 6, wherein the reverse drive brake is a friction brake including casing-side friction members engaged with an inner circumferential surface of the brake retaining portion through a recessed/raised portion formed on the inner circumferential surface such that the casing-side friction members are not rotatable, and gear-side friction members engaged with the selectively fixed rotary element of the planetary gear set through a recessed/raised portion formed on the selectively fixed rotary element such that the gear-side friction members are rotated together with the selectively fixed rotary element, the casing-side friction member and the gear-side friction members being frictionally engaged with each other to fix the selectively fixed rotary element to the brake retaining portion, and wherein the recessed/raised portion of the inner circumferential surface of the brake retaining portion which engages the casing-side friction members such that the casing-side friction members are not rotatable functions as the fixing portion.

8. The vehicular power transmitting system according to claim 1, wherein the reverse drive brake is a friction brake including casing-side friction members engaged with an inner circumferential surface of the brake retaining portion through a recessed/raised portion formed on the inner circumferential surface such that the casing-side friction members are not rotatable, and gear-side friction members engaged with the selectively fixed rotary element of the planetary gear set through a recessed/raised portion formed on the selectively fixed rotary element such that the gear-side friction members are rotated together with the selectively fixed rotary element, the casing-side friction member and the gear-side friction members being frictionally engaged with each other to fix the selectively fixed rotary element to the brake retaining portion, and wherein the recessed/raised portion of the inner circumferential surface of the brake retaining portion which engages the casing-side friction members such that the casing-side friction members are not rotatable functions as the fixing portion.

* * * * *